United States Patent
Ngan et al.

(10) Patent No.: US 8,233,676 B2
(45) Date of Patent: Jul. 31, 2012

(54) REAL-TIME BODY SEGMENTATION SYSTEM

(75) Inventors: King Ngi Ngan, Shatin (CN); Hongliang Li, Henan (CN)

(73) Assignee: The Chinese University of Hong Kong, Hong Kong SAR (CN)

( * ) Notice: Subject to any disclaimer, the term of this patent is extended or adjusted under 35 U.S.C. 154(b) by 1181 days.

(21) Appl. No.: 12/044,416

(22) Filed: Mar. 7, 2008

(65) Prior Publication Data

US 2009/0226044 A1 Sep. 10, 2009

(51) Int. Cl.
*G06K 9/00* (2006.01)

(52) U.S. Cl. ........ 382/118; 382/195; 382/282; 382/190; 382/224; 382/254; 358/538

(58) Field of Classification Search ................. 382/118, 382/195, 282, 190, 224, 254, 154; 358/538; 348/222.1, 207, 99, 169
See application file for complete search history.

(56) References Cited

U.S. PATENT DOCUMENTS

| | | | |
|---|---|---|---|
| 6,130,964 A | 10/2000 | Marques et al. | |
| 6,337,917 B1 | 1/2002 | Onural et al. | |
| 6,400,831 B2 | 6/2002 | Lee et al. | |
| 6,546,117 B1 | 4/2003 | Sun et al. | |
| 6,661,918 B1 | 12/2003 | Gordon et al. | |
| 6,674,925 B1 | 1/2004 | Schoepflin et al. | |
| 6,707,851 B1 | 3/2004 | Choi et al. | |
| 6,728,314 B2 | 4/2004 | Kan et al. | |
| 6,731,799 B1 | 5/2004 | Sun et al. | |
| 6,766,054 B1 | 7/2004 | Christensen et al. | |
| 6,912,310 B1 | 6/2005 | Park et al. | |
| 6,940,545 B1* | 9/2005 | Ray et al. | 348/222.1 |
| 6,973,212 B2 | 12/2005 | Boykov et al. | |
| 6,977,664 B1 | 12/2005 | Jinzenji et al. | |
| 7,190,809 B2 | 3/2007 | Gutta et al. | |
| 7,203,360 B2 | 4/2007 | Lee et al. | |
| 7,224,852 B2 | 5/2007 | Lipton et al. | |
| 7,227,893 B1 | 6/2007 | Srinivasa et al. | |
| 7,254,257 B2 | 8/2007 | Kim et al. | |
| 7,620,218 B2* | 11/2009 | Steinberg et al. | 382/118 |
| 2002/0102024 A1* | 8/2002 | Jones et al. | 382/225 |

(Continued)

FOREIGN PATENT DOCUMENTS

| | | |
|---|---|---|
| CN | 1529278 | 7/2006 |
| CN | 101002682 A | 7/2007 |
| WO | WO 2008/022156 A2 | 2/2008 |

OTHER PUBLICATIONS

International Search Report PCT/CN2009/070602 dated Jun. 11, 2009, 11 pages.

*Primary Examiner* — Mike Rahmjoo

(74) *Attorney, Agent, or Firm* — Kilpatrick Townsend & Stockton LLP; Kenneth R. Allen

(57) ABSTRACT

In a human feature recognition system that is intended to provide substantially real-time recognition of body segments, various methods and structures are provided to facilitate real-time recognition with reduced computation requirements, including a face detection module employing an active boosting procedure and a lazy boosting procedure on a hybrid cascade structure, a human body segmentation module and a boundary matting module. The hybrid cascade structure is in the form of a tree where one type of node represents a strong classifier learned from active boosting, another type of classifier is obtained by low-computation-load lazy boosting, and weak classifiers are obtained from the previous layers.

13 Claims, 6 Drawing Sheets

U.S. PATENT DOCUMENTS

| | | |
|---|---|---|
| 2006/0067591 A1* | 3/2006 | Guzzwell et al. ............. 382/289 |
| 2006/0126905 A1 | 6/2006 | Loo |
| 2006/0126938 A1* | 6/2006 | Lee et al. ...................... 382/190 |
| 2007/0122010 A1* | 5/2007 | Kitamura et al. ............. 382/118 |
| 2007/0183662 A1 | 8/2007 | Wang et al. |
| 2007/0183663 A1 | 8/2007 | Wang et al. |
| 2008/0219558 A1* | 9/2008 | Lu et al. ........................ 382/190 |
| 2009/0263022 A1* | 10/2009 | Petrescu et al. ............... 382/195 |

* cited by examiner

REAL-TIME BODY SEGMENTATION SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to three-dimensional data analysis and more particularly to object segmentation for pattern recognition with application to computer vision.

Object segmentation has been a key technique for semantic object extraction and is useful in digital video processing, pattern recognition, and computer vision. The task of segmenting/tracking a three dimensional image in the form of a video object emerges in many applications, such as video monitoring and surveillance, video summarization and indexing, and digital entertainment. A sampling of applications includes:

Video surveillance, where the segmentation result is used to allow the identification of an intruder or of an anomalous situation and helps to anticipate and reveal patterns of actions and interactions with one another in an environment to determine when "alerts" should be posted to a security unit.

Content-based video summarization, such as sports event summary, video skimming, video pattern mining, namely, tasks that require the segmented semantic objects to perform the content classification, representation or understanding.

Content-based coding applications in which each frame of a video sequence is segmented into semantically meaningful objects with arbitrary shape.

Computer vision, such as video matting, video "tooning" and rendering, where segmented two-dimensional objects from the input image or video sequences can be used for 3-D scene reconstruction.

Videoconferencing and video telephony applications, in which segmentation can achieve a better quality by coding the most relevant objects at higher quality.

Digital entertainment, where some specific objects can be replaced by segmentation, such as the video games.

Other possible applications include industrial inspection, environmental monitoring, or the association of metadata with the segmented objects, etc.

Human image object segmentation is generally considered a crucial step for human recognition, behavior analysis or human-to-machine communication. The dataset and characteristics obtained from an image or the like as a so-called human object can be applied in many fields, such as video surveillance, computer vision, and video entertainment. For example, the extracted human object can be used to allow the identification of suspicious behavior, and it may help to detect problematic actions and alert a security center to possible dangers.

Generally, object segmentation can be divided into two stages, i.e., desired object detection, concerned with the pattern recognition, and object extraction, concerned with clustering techniques. In detection mode, object segmentation can be performed in two ways, supervised and unsupervised. However, it is usually difficult to find the desired object automatically (unsupervised) due to various object features, such as color, intensity, shape, and contour. To avoid false detection for segmentation of an object of interest, many interactive methods have been developed, which need to define the desired object in advance by the user. Since the complicated step of object detection is avoided at the cost of interactive effort on the part of the user, these methods usually can provide users with much better segmentation performance than automatic ways.

In order to satisfy the future content-based multimedia services, the segmentation of meaningful objects in unsupervised manner is urgently required in the real-world scenes.

Many video segmentation approaches can be found in the literature, and generally make uses of both spatial and temporal information. The spatial segmentation method partitions each frame into homogeneous regions with respect to color or intensity. Typical partition approaches can be generally divided into region-, boundary-, and classification-based approaches.

The spatial segmentation approach, which involves the region growing, splitting, and merging, relies on the homogeneity of localized features such as color, texture, motion, and other pixel statistics. The temporal segmentation approach employs primary gradient information to locate object boundaries. In the classification-based approach, a partition of the feature space is first created and then translated into the video signal. This method enables a combination of cues, such as texture, color, motion, and depth. The spatial segmentation approach can yield relatively accurate object boundary. However the computational complexity is sufficiently high and to limit usage to other than real-time applications since the segmentation has to be done on the whole image for every frame. In addition, a main issue of the spatial-based approaches is the lack of robustness for the 'corrupted' cases, such as a noisy or blurry video image where the boundaries of a region are usually missed or blended with other regions.

Temporal segmentation, on the other hand, utilizes motion rather than spatial information to obtain the initial position and boundary of objects. So-called change detection masks are the most common forms of motion information incorporated into the segmentation process. Because the objects of interest are usually moving, change detection can be done on the inter-frame or background-frame basis. Due to the image noise, objects boundaries are often irregular and must be refined using the spatial information of the image. As the boundary fine-tuning procedure involves only the segmented moving region instead of the whole frame, higher efficiency is achieved. However, shadow effects, reflections and noise might be incorrectly assigned to foreground objects. Moreover, it is usually difficult to distinguish between changes due to true object motion and changes due to noise, shadow effects, etc.

Most existing video image segmentation techniques fail to automatically extract the objects in the image, since objects of interest usually correspond to multiple regions that may have very great spatial-temporal variations. It is difficult to segment these objects automatically without any primary criteria for segmentation. An intrinsic problem of the "blind-segmentation" algorithms, which have no contextual knowledge assumption regarding the object being segmented, is that objects of interest may not be homogeneous with respect to low-level features, or the objects may change with the environmental factors, such as lighting conditions, etc.

For these and other reasons, there is a need for improved object segmentation adapted to the dynamic human form.

SUMMARY OF THE DISCLOSURE

In a human feature recognition system that is intended to provide substantially real-time recognition of body segments, various methods and structures are provided to facilitate real-time recognition with reduced computation requirements, including a face detection module, a human body segmentation module and a boundary matting module. In a specific embodiment, the face detection module employs an active boosting procedure. In a further embodiment the face detection module employs a lazy boosting procedure on a hybrid cascade structure to speed up object detection. The hybrid cascade structure is in the form of a tree where one type of node represents a strong classifier learned from active boosting, another type of classifier is obtained by low-computation-load lazy boosting, and weak classifiers are obtained from the previous layers.

A useful contribution of the invention is a features-based rejector that can reject non-facial samples while detecting valid faces. The rejector employs non-normalized Haar transforms to aid in the rejection process. Other mechanisms include active boosting and passive boosting, the passive boosting taking advantage of foreground features of a previous frame. Provided in specific embodiments are fine and coarse segmentation and automatically generated trimaps using energy minimization techniques. Other features include methods according to algorithms specifically developed for real-time segmentation.

Among many advantages, the invention makes it possible to manipulate the object independently, so that suitable coding algorithm can be applied for each object resulting in subjective quality improvement.

The invention has application to the contemplated content-based real time multimedia services offered by telecommunication companies and service industries, such as banks and hotels and security agencies, all of which provide the multimedia services. For example, the telecommunication company can incorporate this technology into products to provide better multimedia services for the clients, with better visual quality based on content-based coding, video content browsing (e.g., TV or movie programs) and retrieval, video gaming, etc. This invention also supplies a key technology to video surveillance applications, which can provide the segmented objects (human beings) to be identified and tracked for some specific users, such as banks, supermarkets and hotels. In addition, as an important technique in the pattern recognition field, the result of this project may also be used for face recognition in the passports, ID/credit cards or other photo-bearing certificates.

Products based on this invention can directly enhance the competitiveness for real-time multimedia services and raise the technology level of a local telecommunication industry.

The invention will be better understood by reference to the following detailed description, in connection with the accompanying drawings.

DESCRIPTION OF SPECIFIC EMBODIMENTS

Figure 1A:
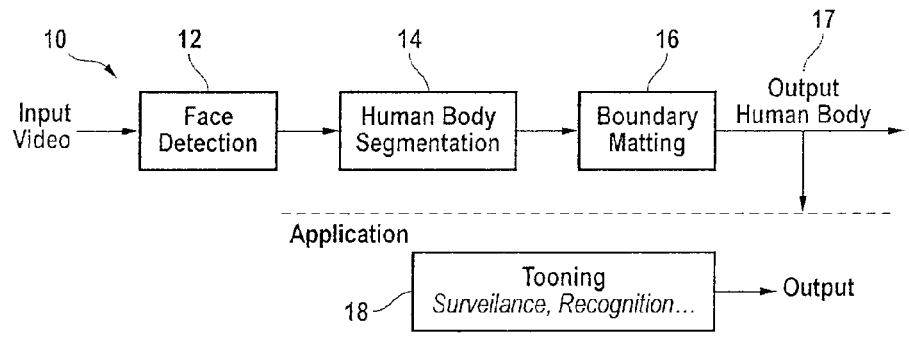
FIG. 1A is a block diagram of a framework of an embodiment of an object segmentation system according to the invention.
Figure 1B:
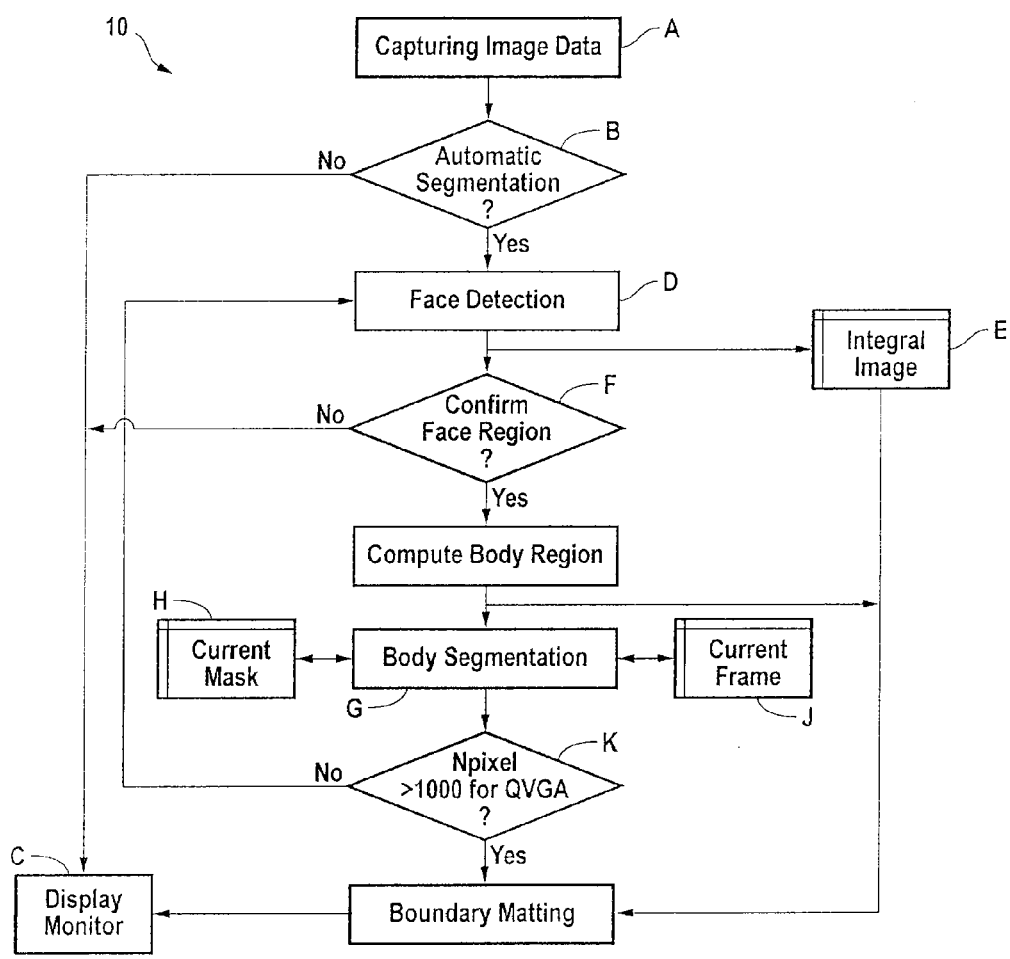
FIG. 1B is a flow chart illustrating operation of a system according to an embodiment of to the invention.

It has been found that some specific objects of interest can be detected by designing appropriate detectors based on a physical model or training scheme. FIG. 1A is a block diagram of an object detection system 10 adapted to identify components of the human body by segmentation of image elements. FIG. 1B is a related flowchart of the system 10.

Referring to FIG. 1A, by concentrating on the problem of a human body, contextual confusion is minimized and automatic segmentation of the human body is facilitated, which is particularly useful for real-time and interactive systems where there is a dominant person in the live videos. The present system 10 has three key processes: object detection concentrating for example on face detection 12, object segmentation concentrating on the structure of the human body 14, and boundary matting 16. The output is a useable data description of the human body 17 that is suitable for use in an application, herein termed toning 18. The detailed considerations of each technique are summarized hereinafter.

Referring to FIG. 1B, the video input is first captured as image data (Step A), and if it is not to be processed (Step B), it is directed to a display monitor (Step C). It it is to be processed, i.e., automatically segmented (Step B), face detection processing is first applied (Step D), the output from which an integral image is constructed (Step E) and tested to confirm it is a face region (Step F). With no confirmation, the output is displayed (Step C). With confirmation, the data is used to compute the body region (Step G), and the body segmentation process is applied (Step G) interacting with a current mask (Step H) and a current frame (Step J). If the segmentation yields a number of pixels, less than 1000 (Step K), then the face detection process is invoked again (Step D). Otherwise the boundary matting process (Step L) is invoked in combination of the integral image input (Step E) to produce an output result for at least display (Step C) or other data application.

Figure 2:
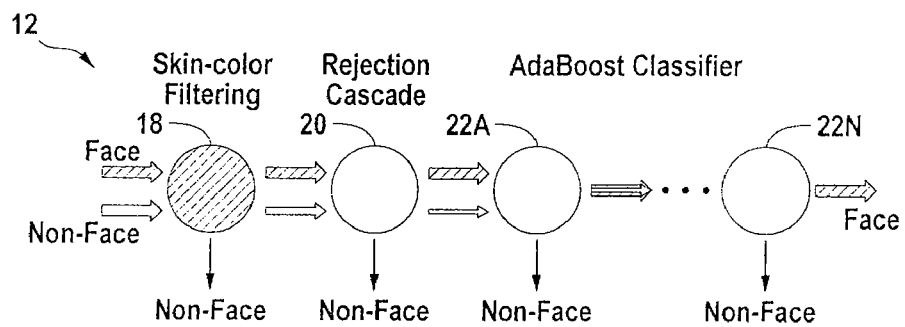
FIG. 2 is a simplified flow chart of a human face detection procedure.

Human Face Detection: As a highly non-rigid object, the human face is characterized by a high degree of variability in size, shape, color, and texture. The boundary between the face and non-face patterns is also highly non-linear because of variations in facial appearance, lighting, head pose, and expression. In a typical operation, the face detector 12 (FIG. 2) scans the image at many scales, looking for face locations within the scaled windows. There are three components or sub-processors: a skin color filter 18, a rejection cascade 20, and cascades-of-boosted-face classifiers 22A, . . . , 22N. The skin-color filter 18 is used to clean up the non-skin regions in the color image during face detection. The rejection element 20 is used to remove most of the non-face candidates while allowing 100% accuracy for face detection. The promising face-like locations will be examined in the final boosted face classifiers 22A-N.

Rapid skin color filtering in Cb—Cr color spac As is known, skin-color can be detected in the skin color filter 18 by sensing the presence of a certain range of chrominance values with narrow and consistent distribution in the YCbCr color space. Within element 18, optical filters and/or wavelength-specific photodetectors in connection with an analog-to-digital converter, image scanning and color-at-position classification software may be used for this purpose. The empirical range for the chrominance values employed are typically Cr=[130, 175] and Cb=[75, 130]. Since the face region usually exhibits similar skin-color features regardless of different skin types, it is possible to quickly eliminate or skip most of non-skin color regions to save considerable computation time.

Assume S(m, n) represents the filtered binary result at position (m, n) in a current image, i.e., "1" for the skin-color chrominance values or "0" otherwise. We then compute the integral image of the binary map. If no or less skin-color pixels appear in this scanning window w×w, we can declare that no human face is found in the current window and the dataset for that window can be skipped. Here, the threshold is set to a small value (e.g., 0.06 w×w).

The features-based rejector: A features-based rejector 20 is preferably a cascade of rejection modules, together designed to reject a large number of non-face samples while detecting almost 100% of valid faces. The cascade can significantly reduce computation time before more complex face classifiers are called upon to achieve low false positive rates. Simple features can be used as a flag for constructing an efficient rejector module that can be part of a cascade. Since these features are also used for the boosting face classifier elements 22 that follow the rejection cascade 20, little or no additional computation is needed for certain feature generations.

There are two feature sets: The first feature set is region variance, which can be obtained from two integral images, i.e., "integral image" and "integral image of the image squared." It is known that those integral images are used to perform lighting correction during the image scanning process. For 24×24 pixel images, there are 76,176 variance features to be considered. Assuming $\sigma_i$ denotes the variance of the $i^{th}$ region, the training process can be described in Algorithm 1:

Algorithm 1: Training for Rejector Using Variance Features
1. Input training examples $(x_1, y_1), \ldots, (x_n, y_n)$, where $y_i=0$, 1 for non-face and face examples, respectively.
2. Initialize rejection label $l_i=0$, for $y_i=0$.
3. For t=1, . . . , T:
4. Find the minimal and maximal values of $\sigma_k^1$ for each region k from the face training examples, which is denoted by $\sigma_k^{-1}$ and $\sigma_k^1$, respectively.
5. Compute the rejection number $r_k$ for non-face training set, i.e., $$r_k^p = \sum_{y2=0,1,=0} \text{sign}[p\sigma_{i,k} > p\sigma_k^p],$$

6. Choose the region with the highest rejection number.
7. Set label $l_i=1$ for all rejected samples $\{i\}$.
8. Repeat from step 3.

The second feature set is the difference between two low-low (LL) non-normalized Haar transform (NHT) coefficients. Since these coefficients will be used to compute the high frequency NHT coefficients as the input features for a training stage, such as the readily available AdaBoost binary classification learning algorithm as the training stage, there is no additional computation load associated with this feature set generation. Based on the rescaling advantage of the Haar features, only the LL coefficients are used, namely, with a block size of 4×4 as the training set, which includes 97,020 features for a 24×24 pixel image. The training method is similar to the first one with small modifications from step 4 to 6, as in Algorithm 2:

Algorithm 2: Training for Rejector Using Block Differences
4. Find the minimal and maximal values of $D_{(k,j)}=LL_k-LL_j$ for two arbitrary coefficients from the face training examples, which are denoted by $D_k^{-1}$ and $D_k^1$, respectively.
5. Compute the rejection number $r_k$ for non-face training set, i.e., $$r_k^p = \sum_{y2=0,1,=0} \text{sign}[pD_{i,(k,j)}\sigma_{i,k} > pD_{(k,j)}^p],$$

6. Choose the difference feature with the highest rejection number.

With between 40 and 50 rejectors for the region variance set and the LL NHT coefficients set, respectively, the system can yield a rejection rate of 98.269% and a detection rate of 100% on a testing dataset. Compared with the LL NHT coefficients, region variance exhibits a relatively higher rejection rate. It has been observed that the first variance feature rejector can reject about 47.6% of the non-face images while yielding 100% detection rate for a training face set of 500,000 non-face images and 12,536 face images.

Figure 3:
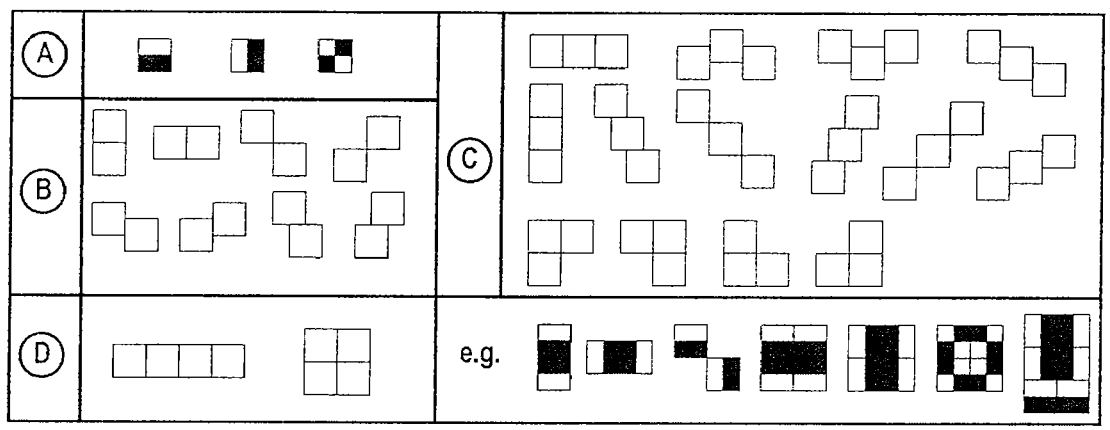
FIG. 3 is a graphic illustrating examples of feature set-based non-normalized Haar transform (NHT) coefficients.

Since the Haar-like features can be computed very rapidly using the integral image, most of these methods construct the weak classifier by selecting one feature from the given feature set. Four kinds of features shown in FIG. 3 are constructed based on different NHT coefficients. In some sense, these coefficients are more like 'toy bricks', which can be built according to a certain style composition. Each feature consists of one or more 'bricks' which are combined by means of arithmetic operations, specifically, addition, subtraction, and absolute value operations. Examples can be found in the right-bottom column of FIG. 3. The first two features are obtained by computing the differences between two LH and HL coefficients, respectively. The sixth center-surround feature can be obtained by the addition and subtraction of four HH bricks. For a window size of 24×24, the number of over-complete features is quite large, such as 2646 for feature A, 69768 for feature B, 830574 for feature C, and 1045386 for feature D.

Active Boosting: Active boosting is characterized by a feature set, importance weights sampling, a Kullback-Leibler confidence map, a mean-shift based region partition, and active feature selection. Each of these characteristics is explained herein after.

Figure 4:
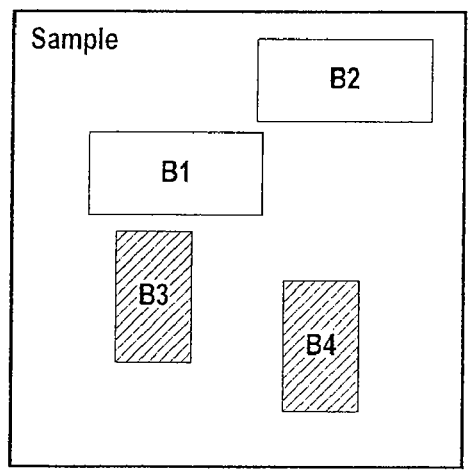
FIG. 4 illustrates the forms of rectangle blocks that serve as the basic unit of the learning feature.

1) Feature Set: As shown in FIG. 4, the form of a rectangle block (Column A) is taken as the basic unit of the learning feature. Each feature is constructed by the linear combination of two or four blocks (Columns B, C, D). By appropriately adjusting the composition of these blocks, coefficients with different Haar-like features can be generated. Assume the input examples have the size of 24×24. The number of the possible rectangle blocks will be 76176. Therefore, the total number of features which consists of four blocks may reach 3.3672e+019. Even for one second per weak classifier, the total running time still need 3.8973e+014 days, which is unimaginable for a training process. It is known the feature set is over-complete, where many features have small contributions for the best classifiers. However, they will take up most of the training time during the brute-force searching in the whole feature set. An optimal features set may be constructed in an interactive manner.

2) Importance Weights Sampling: The first step of the algorithm according to this embodiment of the invention is importance sampling from the weights distribution, namely to eliminate samples with low importance weights and multiply samples with high importance weights.

Figure 5:
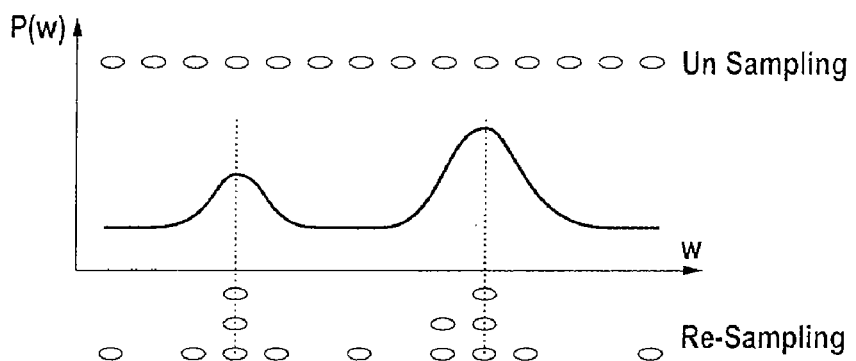
FIG. 5 is a probability graph showing the sampling results for given normalized weights.

As mentioned herein above, the incorrectly classified examples will be assigned more weights in the next boosting stage, while small weights will be held for those correct instances. However, the number of the sample is fixed either for the sample with large weight or the smaller one. FIG. 5 shows the sampling result for given normalized weights. The curve denotes the weight distribution which may be obtained by the Boosting procedure. It is seen that those examples with large weights will be increased after the re-sampling step. This process is very important for the subsequent feature selection step because the selection is based on the information gain among the training data.

3) Kullback-Leibler Confidence Map: Let $\{(x_1^s, y_1^s), (x_2^s, y_2^s), \ldots, (x_n^s, y_n^s)\}$ denote the re-sampled data from the original examples. Assume each of the sample x's can be written as $\{x^s(e_1), x^s(e_2), \ldots, x^s(e_d)\}$ where $e_i$ is the $i^{th}$ element (e.g., pixel). Let $\Omega_e$ represent the element set of the given sample. Using the re-sampling data, the Kullback-Leibler (KL) divergence is employed to measure the difference between the positive and the negative samples. Here the symmetric Lullback-Leibler Distance (KLD) is used, which is defined as $$KLD(P, Q) = \int q(x) \log \frac{q(x)}{p(x)} dx + \int p(x) \log \frac{p(x)}{q(x)} dx \quad (1)$$

Rule 1: A feature can be considered as the candidate weak classifier if one of the blocks has a large KL divergence distance while the others have small KL divergence distance.

In order to choose the eligible features according to Rule 1, first compute the KL divergence for each element $e_i \in \Omega_e$. Assume $C(e_i)$ denotes the KL measurement at the element $e_i$ from the positive and negative samples $x^s$. Here, the set C is called the KL confidence map of given samples, which describes the differences of the positive and negative samples at each element.

4) Mean-shift based Region Partition: To find a block feature from the KL confidence map, mean-shift filtering is employed to perform the clustering, which can partition the confidence map into different regions according to the confidence values. Mean-shifting is a nonparametric method that estimates the mode of a density distribution in an iterative procedure. The kernel in the mean shift procedure moves in the direction of the maximum increase in the joint density gradient.

5) Active Feature Selection: Let $(z_i, l_i)$ denote the segmentation result of the confidence map C, where $l_i$ is the region label. Let $z_{max}$ and $l_{max}$ represent the maximal values of $z_i$ and label l, respectively. Then a coarse-to-fine technique is used to perform the feature searching.

Figure 6:
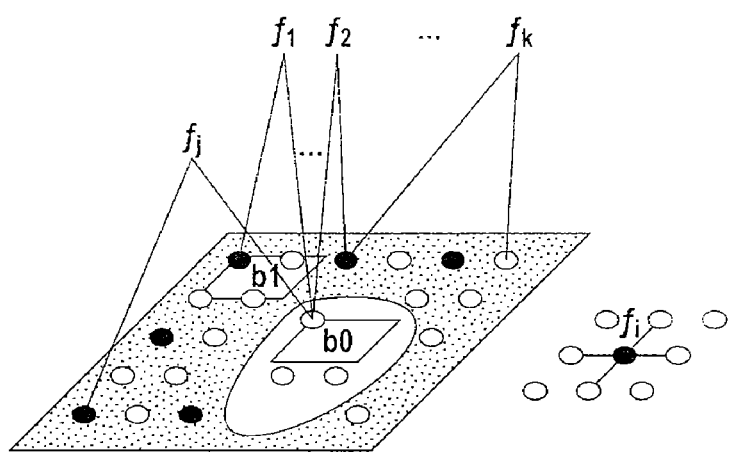
FIG. 6 is a pair of related three-dimensional graphs illustrating two-block features construction.

Since the low confidence block is selected to be at half resolution, the fine stage is tasked to search the neighboring positions when the best candidate is found by the boosting stage. An illustration can be found at the right side in FIG. 6. In addition, it should be noticed that this fine processing will be imposed on each high confidence block.

In the feature searching process, two thresholds are employed, i.e., $\tau_1$ and $\tau_2$ to truncate the search range for the two-block features. The large value of $\tau_2$ or the small value of $\tau_1$ will increase the number of the feature set. In the present specific embodiment, set $\tau_1 > 0.5$ and $\tau_2 < 0.5$. Different thresholds will be used for a different cascade of classifiers.

Apart from the two-block features, four-block features are also considered within the contemplation of the invention. After the two-block features boosting step, some of the features with lower errors are selected, and the classification error is evaluated by the linear combination. The final best weak classifier that is selected is the best one among the two/four-block features. The detailed composition procedure is given as follows:

For each two-block feature,
Perform the boosting procedure,
Record the classification error,
B. Select the two-block feature with lowest error and sort the two-block features according to errors in (ascending) order,
C. Select the top m two-block features.
Compose four-block features from the m two-block features,
Perform the boosting procedure on each four-block feature,
Record the classification error,
D. Compare the four-block features with the best two-block feature and select the feature with the lowest error.

Lazy boosting: Unlike the active boosting learning algorithm, lazy boosting is specified for the cascade of classifiers, and it is used to improve detection performance while saving computation time significantly. The method will be described in greater detail after an explication of a particular cascade structure.

Figure 7A:
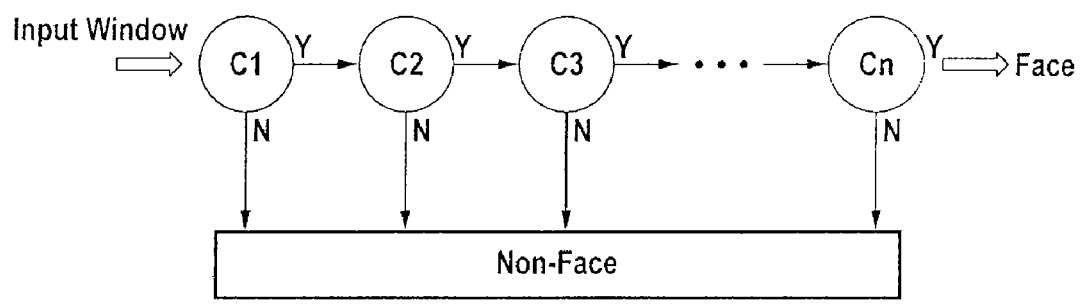
FIG. 7A is an illustration of a cascade classifier known in the art.
Figure 7B:
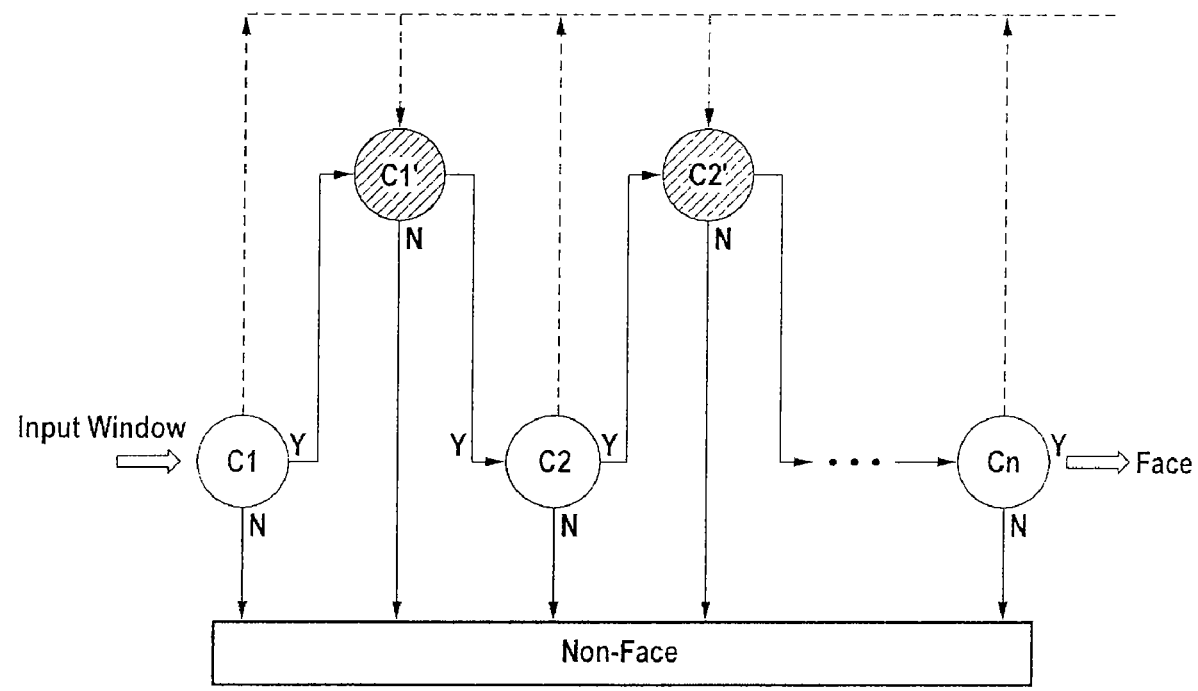
FIG. 7B is an illustration of a hybrid cascade structure according to the invention.

Hybrid Cascade Structure: The straight-forward cascade structural form is known for the purpose of efficiently eliminating as many negative samples as possible. FIG. 7A and FIG. 7B are illustrations of cascade classifiers. FIG. 7A is a cascade structure known in the art. FIG. 7B is a cascade structure and more specifically, a hybrid cascade structure.

FIG. 7A shows a decision tree diagram. Each layer in the cascade is adjusted to have a high detection rate with a predictable "false" rate. Only the "accepted" samples are allowed to enter the next layer. After several layers' worth of detection, most of the computation concentrates on the few positive samples rather than the negative samples.

According to an embodiment of the invention, a hybrid cascade data structure is provided to speed up object detection and the processing required. Such a cascade structure in the form of a tree is shown in FIG. 7B, where the nodes Ci represent a strong classifier learned from active boosting. The primed nodes Ci' denote a strong classifier obtained by lazy boosting. The weak classifiers come from the previous layers as indicated with dashed lines representing data paths in FIG. 7B. Since there are no additional computations for finding the weak classifiers in Ci', the detection performance will be very efficient, and it only needs a few multiplications and additions to construct the strong classifier. The detailed description of lazy boosting is described herein below.

Lazy boosting is intended for use in the hybrid cascade structure. The method aims to utilize the weak classifiers as efficiently as possible. In the general cascade of classifiers shown in FIG. 7A, each weak classifier in a certain layer may be selected from hundreds of thousands of features that is the best one in the given feature set. However, these best features are used only once. The purpose of each layer is to find the best strong classifier that achieves the required detection rate.

In the boosting algorithm according to an embodiment of the invention, named a lazy boosting algorithm, detection efficiency is the focus instead of best performance for each weak classifier. The weak classifier in the lazy boosting algorithm may be not the best one because the weak classifiers are selected from the previous layers. Since the outputs of these weak classifiers have been computed before the lazy boosting steps, there are no computations needed for them. Computations are the focus of the final classifier, which contains only several multiplication and additions. The detailed lazy boosting algorithm is given as follows:

Lazy Boosting Algorithm
1. (Input)
    Input training examples $(x_1, y_1), \ldots, (x_n, y_n)$, where xi represent the sample and $y_i=1$ or $-1$ for positive and negative examples respectively.
2. (Initialization)
    Initialize sample weights wi=½p and ½q where p and q are the number of positive and negative examples
3. (Lazy Boosting)
    Repeat for t=1, . . . , T.
        a. Normalize weights $w_{t,j}$
        b. Get the Weak Classifiers from the previous layers.
        c. Compute the classification error for given weak classifiers
        d. Choose the best weak classifier with the lowest error
        e. Update weight
4. (Output)
    Output the combined classifiers.

Contributions in human segmentation: After face detection, one can access the face locations in the input image rapidly. A min-cut optimization method is described herein below to perform the face segmentation algorithm in the obtained face regions.

Generally, when the foreground or background is clearly defined by the user inputs, the segmentation process can be carried out based on graph cut optimization. Unfortunately, in the unsupervised manner, there will only be the coarse face locations that are obtained from the boosting face detector. The corresponding sub-window may cover the complete face contour or only some parts of face regions. This means that the pixel outside the window may belong to the background, while the pixel inside the window is likely to be part of the face. One cannot determine with confidence which pixel should be marked as the background or foreground. Hereafter the technique is described to segment the face region under the over-incomplete labeling condition.

A. Cost function: A graph $G=\langle V, E \rangle$ is defined by a set of nodes V (e.g., pixels or regions) and a set of directed edges E that connect these nodes. If each pixel denotes a node, the segmentation of an image $Z=\{z_i\}$ can be expressed by solving an energy function based on two cost functions, i.e., the data cost E1 for assigning each node i to the Foreground or Background label, and the smoothness cost E2 for measuring the similarity between two nodes:

$$E(Z) = \sum_{i \in V} E_1(z_i) + \lambda \sum_{(i,j) \in \varepsilon} E_2(z_i, z_j) \quad (2)$$

Data cost E1: The E1 term is used to set the penalties for assigning each pixel to foreground or background. Generally, in the interactive method, two terminals F and B or at least the B terminals has been defined by the user input. Thus, some hard constraints can be imposed to guarantee the consistent label with the user's paints by the min-cut procedure. It means that infinite cost might be employed when the assigned label violates the user's paint strokes. However, there are no pre-defined terminals in automatic processing. Therefore, the following novel derivation of E1 is employed.

Figure 8:
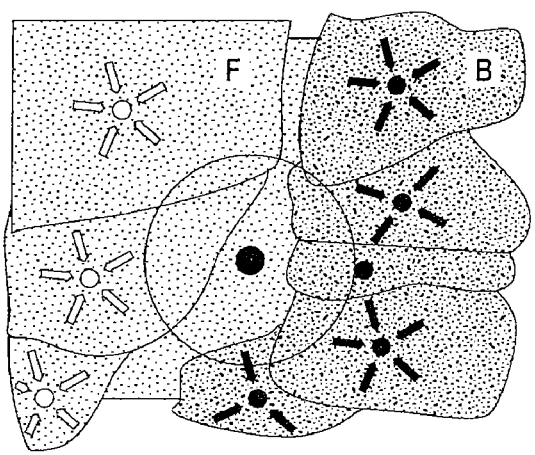
FIG. 8 is a graphical illustration of computation for weight coefficient w, where F and B denote the foreground and background, respectively.

In a specific embodiment, Gaussian mixture models (GMM) are used to model the color distributions of the foreground or background based on the initial face locations. For a given pixel i with the color $z_i$ and label $\alpha(i)$, its distances to the foreground F and B are defined as follows:

$$E_1(\alpha(i) \in F) = \frac{\log(d_i^F)}{\log(d_i^F) + \log(d_i^B)} \quad (3)$$

$$E_1(\alpha(i) \in B) = \frac{\log(d_i^B)}{\log(d_i^F) + \log(d_i^B)} \quad (4)$$

with $$d_i^F = \sum_{k=1}^{K} w_k^F \left(\frac{1}{1 + 2\det\sum_k}\right)^{1/2} \exp\left(-\frac{1}{2}[z_i - \mu_k^F]^T \sum_k^{-1} [z_i - \mu_k^F]\right) \quad (5)$$

$$d_i^B = \beta d_i^{B1} + (1-\beta) d_i^{B2} \quad (6)$$

$$d_i^{B1} = \sum_{k=1}^{K} w_k^B \left(\frac{1}{1 + 2\det\sum_k}\right)^{1/2} \exp\left(-\frac{1}{2}[z_i - \mu_k^B]^T \sum_k^{-1} [z_i - \mu_k^B]\right) \quad (7)$$

$$d_i^{B2} = \left(\frac{1}{1 + 2\det\sum_i^O}\right)^{1/2} \exp\left(-\frac{1}{2}[z_i - \mu_i^O]^T \sum_k^{-1} [z_i - \mu_i^O]\right) \quad (8)$$

where $w_k$ denotes the weights corresponding to the percentage of the spatial samples for the kth component of the GMM, and $\mu_k$ and $\Sigma_k$ represent the mean color and the covariance matrices, respectively. K denotes the number of the components of the GMM in the foreground and the background. An example of weights computation is illustrated in FIG. 8, where the left side and right side denote the foreground F and background B, respectively. The spatial samples for the pixel (between the F and B regions) can be calculated according to the number of clustered pixels within the circled region.

Smoothness cost E2: The E2 term is used to set a penalty for a discontinuity between two nodes (e.g., two pixels). It become larger when the smaller change is found between pixel i and j, which means smaller probability of an edge appearing between the adjacent pixels. The general format is defined in terms of the local intensity gradient. The novel derivation allows adoption of this exponential function based on the gradient but without label constraints.

Background learning: The distance between each node and background consists of two parts, which is mixed by a weighted coefficient β. The first $d_i^{B1}$ is computed in terms of the color distribution of the background in the current frame i, while the second $d_i^{B2}$ is learned from the initialization. By adjusting the weight β, we can incorporate more or less prior background information into the current edge link computation. For example, If β is set to 0, the link to the background of each node only depends on the prior knowledge, which can be found for those static scenarios, such as video surveillance. On the contrary, the dynamic scenes especially for those fast moving background, the larger weight should be considered.

Each pixel in the background learning is modeled as Gaussian distribution, which has the mean $\mu_i^O$ and variance $\Sigma_i^O$. They are learned from the initialization of the system. We use 500 frames to estimate the mode parameters.

B. Coarse-to-fine segmentation: One must build the color distributions from the incompletely marked human body regions. The proposed method works at two levels, i.e., coarse and fine scales.

Figure 9:
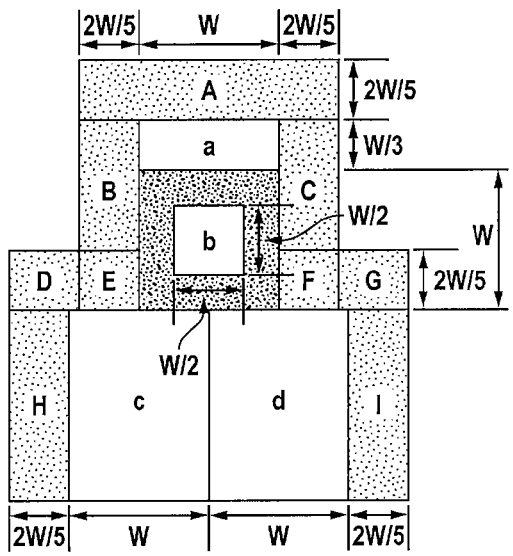
FIG. 9 is a two-dimensional graphical illustration showing how rectangles are employed in initial region selection for coarse segmentation.

The initial segmentation is performed at the coarse level. As shown in FIG. 9 [TLO: novel], there are four regions (i.e., a~d) used for estimating foreground information, whilst nine regions (i.e., A~J) for the background. For example, seven parts, i.e., A, (B+E), (C+F), (D+E), (F+G), H, and I, are selected for estimating the color distributions of the background. We take their means and variances as the initial clusters for the background, which means there are four components to model the GMM in the background. As for the body region, we set the initial Gaussian model with four components. The initial face region is set to a small square window, which is centered in the detection window with the size of W/2×W/2. The corresponding mean and variance are considered as the initial cluster for the face region. For each pixel in this region, we compute the weighted distances to the face and background clusters according to (3), (4) and the similarity with other. Finally, the minimum cut is used to perform the global optimization.

The second level is the finer segmentation, which aims to refine the initial segmentation result. The corresponding foreground regions are defined as the set of the pixels belonging to the body terminal in the current window, while the background regions consist of those pixels outside the window that are classified to the background terminal. We use 8 and 8 components to describe the foreground and background colors, respectively. The mean and covariance of component k are estimated based on the K-means algorithm. Then, the similar method as the coarse scale can be used to compute the energy E1 and E2. Note that in the data cost function E1, the weight of each component is estimated based on the spatial samples within a defined window of 20×20 pixels that is centered with the current node. The min-cut is also used for the final optimization.

Contributions in Tracking-Based Human Segmentation

A. Best position prediction: The body segmentation in the successive frames is achieved by the tracking technique. The first step to track the body in the current frame n is the prediction of the state space in the previous frame (n−1). Here the state space refers to the position of the body region.

For the previous frames, obtain the current position of the candidate body region based on motion estimation. In a specific system, the motion estimation technique is used to obtain the projected position of the candidate focused area based on the idea of coarse-to-fine refinement strategy. First, perform the full-search motion estimation in the sampling space of half the spatial resolution, with a search window of 15. Then, for the best matched position, the search in finer scale will be performed only for eight neighboring points. The sum of absolute difference (SAD) is used as the similarity measure between two regions.

Then, a second-order auto-regression (AR) model is used to describe the state change. When the object's movement is smooth, the AR model can generally provide better prediction results. However, human objects usually change the direction with sudden movement, which leads to inaccurate predictions for the consequent segmentation. In order to avoid this worse case, the error is checked between the prediction and the original positions, and the best one is selected. In addition, a small window centered at the prediction is used to find the best matched position, which is set preferably to 5×5 pixels and 11×11 for moving and static cases, respectively.

Figure 10:
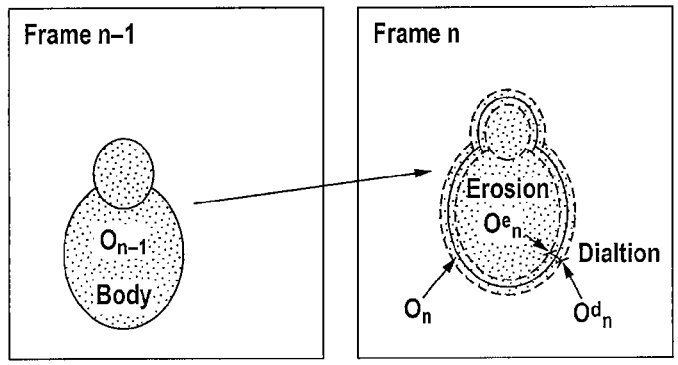
FIG. 10 is a diagram illustrating segmentation according to the tracking scheme.

B. Multi-level segmentation: After the state prediction, one obtains the coarse mask in the current frame n. In order to reduce the computation time, three modes are used to perform body segmentation. The first mode is based on a trimap, which consists of three regions, i.e., foreground region, background region and unknown region. As shown in FIG. 10, $O_{n-1}$ denotes the candidate face region in the $(n-1)^{th}$ frame. The projected area $O_n$ is obtained by prediction in the $n^{th}$ frame. The erosion and dilation morphological operations are then performed on the projected region $O_n$. The obtained regions are denoted by $O_n^e$ and $O_n^d$, respectively. The structuring element used is a square structuring element whose width is 10 pixels. Using processes based on functions represented by equations (2), (3), and (6), one can determine the data and smooth costs for the nodes in the unknown region. The minimum cut is then employed to assign the label to each node.

The first mode runs very fast due to the small set of nodes, while it also can achieve similar segmentation result as the fine segmentation when a human body has no unexpected change. However, in order to avoid the possible accumulated errors caused by the noise effect in the first mode, the second mode is needed, i.e., fine segmentation, to correct the mistakes. As shown in FIG. 10, the pixels in the body and unknown regions are considered as the nodes in the constructed graph. The minimum cut is then employed to assign the label to each node.

C. Update of foreground model [TLO: novel and key to the real time feature of the system]: In order to perform the fast multi-level segmentation, the foreground information in the previous frames is employed. After the segmentation of the current frame, the foreground is updated by the following functions:

$$\mu_i^F(n) = \frac{1}{W}\sum_k \mu_k^F(n)\exp\left(-\frac{1}{2}[\mu_k^F(n)-\mu_i^F(1)]^T \sum_k^{-1}[\mu_k^F(n)-\mu_i^F(1)]\right)$$

$$\sigma_i^F(n) = \frac{1}{W}\sum_k \sigma_k^F(n)\exp\left(-\frac{1}{2}[\sigma_k^F(n)-\sigma_i^F(1)]^T \sum_k^{-1}[\sigma_k^F(n)-\sigma_i^F(1)]\right)$$

With:

$$W = \sum_k \exp\left(-\frac{1}{2}[\sigma_k^F(n)-\sigma_i^F(1)]^T \sum_k^{-1}[\sigma_k^F(n)-\sigma_i^F(1)]\right)$$

where W is the normalizing factor, $\mu_i^F(n)$ and $\sigma_i^F(n)$ denote the mean and variance of $i^{th}$ components of the foreground for the frame n.

Contributions in boundary matting: Matting is an important operation to separate a foreground element of arbitrary shape from an image by estimating the opacity of the foreground element at every pixel. Since the matting equation shown in Equation 9 has too many unknowns, matting is inherently under-constrained.

$$I = \alpha F + (1-\alpha)B \qquad (9)$$

From Equation 8, one can see that when matte α changes from 1 (or 0) to 0 (or 1), there will be a gradual color transition from foreground (or background) to background (or foreground). Because α value is restricted to the range of [0, 1], the original data I in the matting regions must be a certain value between the foreground and the background.

Figures 11A, 11B, 11C:
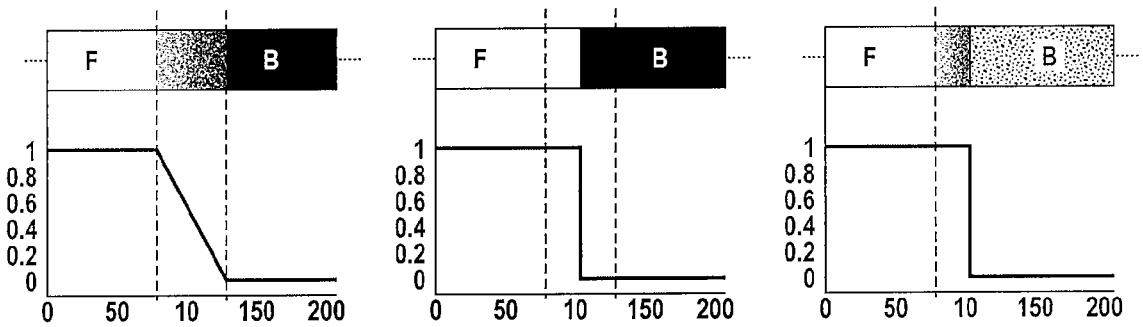
FIGS. 11A-11C are illustrations of matte problems.

A. Adaptive trimap: An adaptive trimap may be used to resolve problems with matting. A typical matting example is illustrated in FIG. 11A, where there are gradually changed progressions between the F and B regions. The upper region has different transition processes between the foreground and the background. The bottom region shows the curve of α matte. In addition, there are still many cases where the distinct boundary can be observed between the background and foreground, which means there is no blending effect occurring between the two regions. When the foreground and the background color distributions are well estimated in the unknown region shown in FIG. 11B, the corresponding α values (1 or 0) can be solved according to the similar method in the first case. However, this method fails in some cases, where one of distributions of two regions cannot be estimated from the neighboring regions. For example, as shown in FIG. 11C, there is a distinct boundary and there are no mixed regions between the foreground and the background although a transition region can be observed in the foreground area. If regions between the two dashed lines are assumed to be the unknown region on which to perform the α computation, the optimized matte will smooth the foreground region in the unknown area, which results in the distinct artifacts. The ill-condition may be avoided by using the manually defined trimap, i.e., three regions of $\Omega_F$ ("definitely foreground region (α=1)"), $\Omega_B$ ("definitely background region (α=0)"), and $\Omega_U$ ("unknown region (α∈[0,1])"), but it is difficult to deal with in unsupervised manner. Unfortunately, the last case is usually observed for the human face boundary.

In order to avoid the unmanageable case and reduce the possible estimation errors, according to an embodiment of the invention, an adaptive method is used to construct the trimap. Generally, generating a trimap automatically can be achieved by using the morphological erosion and dilation to yield the unknown regions based on the initial object boundary. A consistent structure size is employed, such as 5 pixels. According to a specific embodiment of the invention, however, the trimap size depends on the blur degree of the centered pixel with respect to its neighborhood. It means that larger size will be required if this region is well mixed between the foreground and the background; otherwise a small unknown region will be considered. Since matting begins with a closed face contour, the trimap is calculated on each pixel on the initial boundary. A circle with a radius r is used to generate the unknown region by removing and dilating one side of the contour, respectively. Let $r_p$ denote the radius of pixel p on the face contour. This produces:

$$r_p = r_{max} \exp(-k \| I_p - (g * I)_p \|) \qquad (10)$$

where g is a Gaussian function with standard deviation σ (=5), which is used to estimate the smooth degree by means of the convolution operation. rmax denotes the maximal radius that is set to 5 in our work.

A new trimap is generated based on the erosion and dilation operations of the initial face boundary and the corresponding size r of the unknown region. The process erodes and dilates less than $r_p$ pixels for the foreground and the background on the either side of the initial face boundary pixel p. This means that the corresponding structuring element employs the circle structure element with the computed radius r.

B. Alpha estimation using energy minimization: In order to estimate the α in the unknown region $\Omega_U$, define the following energy function is used as a definition:

$$E = E_1 + \lambda E_2$$

where E1 is the error energy, measuring the degree of data estimation, and E2 is the smoothing energy, denoting the changes between adjacent α values.

The energy E1 is defined as:

$$E_1 = \sum_{(m,n)\in\Omega_U} \left[ I_{m,n} - \alpha(m,n)\hat{F}_{m,n} - (1-\alpha(m,n))\hat{B}_{m,n} \right]^2 \qquad (11)$$

$$\hat{F}_{m,n} = \frac{1}{L} \sum_{(j,k)\in\delta^F_{m,n}, \alpha(j,k)\geq 0.95} w_{j,k} F_{j,k} \text{ and} \qquad (12)$$

$$\hat{B}_{m,n} = \frac{1}{L} \sum_{(j,k)\in\delta^B_{m,n}, \alpha(j,k)\leq 0.05} w_{j,k} B_{j,k} \qquad (13)$$

Here, L is a normalized factor for the weighs $w_{j,k}$, which are defined as $\alpha^2 d$ and $(1-\alpha)^2 d$ for the foreground and the background, respectively. d denotes the distance with respect to the pixel (j, k). $\delta_{m,n}^F$ and $\delta_{m,n}^B$ denote the regions centered on the pixel (m, n). In our work, a circular region with a radius of 11 is employed to perform the estimation.

The smoothing term E2 is defined as $$E_2 = \sum_{(m,n)\in\Omega_U} \min\{(f_k * \alpha)_{m,n}^2, k=0,1,\ldots\} \qquad (14)$$

where $f_k$ denotes a filter that corresponds to the direction k. It measures the change of adjacent α in a certain orientation, which encourages α changing smoothly. In our work, we perform the filtering process based on four 4-tap filters with respect to the 0, π/4, π/2, 3π/4 directions.

To minimize the energy function E, the gradient descent optimization method is used. The gradient of energy E can be written as $$\nabla E = 2 \sum_{(m,n)\in\Omega_U} \left[ I_{m,n} - \alpha(m,n)\hat{F}_{m,n} - (1-\alpha(m,n))\hat{B}_{m,n} \right]\left[\hat{B}_{m,n} - \hat{F}_{m,n}\right] + \qquad (15)$$

$$2 \sum_{(m,n)\in\Omega_U} (f_{\min} * (f_{\min} * \alpha))_{m,n}$$

At each iteration, the α value are updated as $$\alpha_{n+1}(m,n) = \alpha_n(m,n) - \tau \nabla E_{m,n} \qquad (16)$$

where τ is the stepsize, which is used to minimize the energy E along the direction and set to 1.5.

The energy minimization problem is an iterative optimization process, which consists of three steps. The first step is the initialization of F and B in unknown region $\Omega_U$ according to Equation 12 and Equation 13. The second step is the update of α value based on the gradient descent optimization. The initial $\alpha_0(x,y)$ for $(x,y)\in\Omega_U$ will be set to 0.5. Then Equation 16 is used to perform the update of the matte value. The final step is (F, B) refinement. If the condition $\alpha(x, y) > 0.99$ for $(x, y) \in \Omega_U$ is satisfied, we will update the face with this matte value set to 1. For the case of $\alpha(x, y) < 0.01$ for $(x, y) \in \Omega_U$, the pixels will be classified to the background. Otherwise, in the case of $0.01 \leq \alpha(x, y) \leq 0.99$, the value of pixel $(x, y)$ will be treated as the mixed result by the foreground $\Omega_f$ and background $\Omega_b$. Therefore, we did not classify those pixels into the segmented foreground region.

Appendix: In order to augment this disclosure, reference is made to the following attached as Appendixes:

Appendix A is a detailed flow chart for a face detection process.

Appendix B is a detailed flow chart for a body segmentation process.

Appendix C is a set of diagrams labeled FIGS. 1-4 that illustrate the processes.

Figure 12:
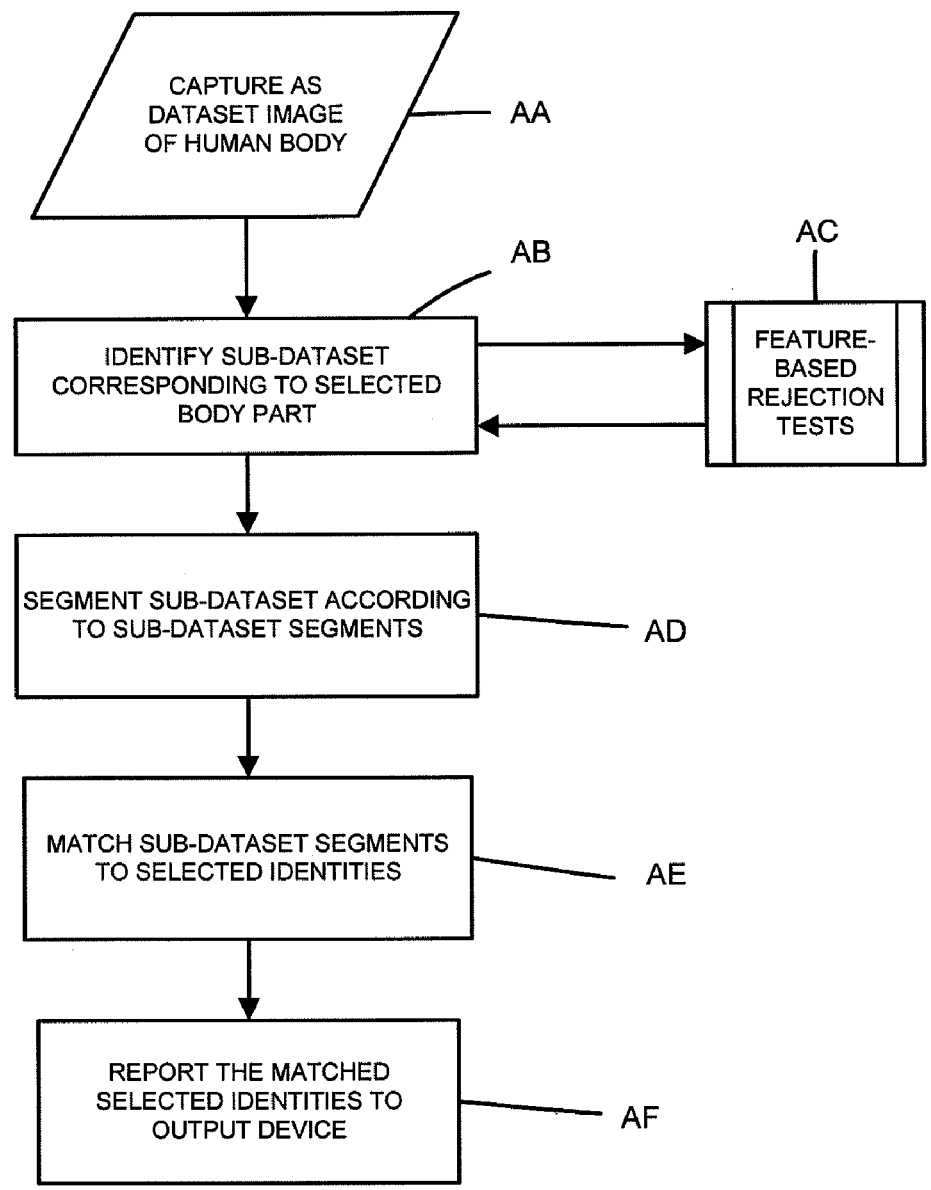
FIG. 12 is a flow chart detailing key steps in a process similar to FIGS. 1A and 1B.

In summary of this disclosure respecting the process set forth, reference is made to FIG. 12. Information in the form of a dataset representing an image of at least a portion of the human body having a known, i.e., selected human body part is captured (Step AA); a sub-dataset corresponding to the selected body part is identified from the dataset representing the image (Step AB) by subjecting the dataset to at plurality of features-based rejection tests (Step AC); the sub-dataset for the selected body part is segmented according to identified sub-dataset segments (Step AD); the sub-dataset segments are matched to the selected identities (Step AE); and the matched selected identities are reported as output to an output device (Step AF).

The invention has been explained with reference to one or more specific embodiments. Other embodiments will be evident to those skilled in the art upon review of this description. Therefore, the invention is not to be limited, except as indicated by the appended claims.

What is claimed is:

1. A method for recognizing characteristics and identity of a selected human body part in order to recognize a human, the method comprising:
    capturing, by a computer system as a dataset an image of at least a portion of the human body having a selected human body part, the human body being shown in a sequence of video frames, the portion of the human body being distinguished thereby from a background;
    identifying, by the computer system, a sub-dataset corresponding to the selected body part from the dataset representing the image by subjecting the dataset to a plurality of features-based rejection tests;
    segmenting, by the computer system, the sub-dataset for the selected body part according to identified sub-dataset segments corresponding to selected identities;
    matching, by the computer system, the sub-dataset segments to said selected identities; and
    reporting, by the computer system, the known identities as an output to an output device;
    wherein said segmenting step employs active boosting, said active boosting characterized by importance weights sampling, a Kullback-Leibler confidence map, a mean-shift based region partition, and active feature selection.

2. The method according to claim 1 wherein the selected body part is the human face and the features based rejection test employs a region variance set based rejection classifier.

3. The method according to claim 2 wherein the features based rejection test further employs, as a further classifier, a feature set constructed of differences between only low-low non-normalized Haar transform coefficients by computing Fast Walsh-Hadamard transforms.

4. The method according to claim 3 wherein the feature set is formed of a plurality of brick-like features combined by addition, subtraction, and absolute value operations.

5. The method according to claim 1 wherein said feature set comprises a plurality of linear combinations of between two and four rectangular blocks that are used to generate features representing Haar transform coefficients.

6. The method according to claim 5 wherein feature set classifying comprises:
    performing, by the computer system, the active boosting procedure on each two-block feature;
    recording, by the computer system, a classification error for each boosting procedure; thereafter
    selecting, by the computer system, the two-block feature with lowest error; by
        sorting the two-block features according to errors in order; and
        selecting a plurality of top two-block features;
    thereafter
    composing, by the computer system, four-block features from the top two-block features; thereafter
    performing, by the computer system, the boosting procedure on each of the four-block features;
    recording, by the computer system, classification error for the boosting procedure; thereafter
    comparing, by the computer system, the classification errors of the four-block features with the classification errors of the top two-block feature; and
    selecting, by the computer system, that feature with the lowest overall error.

7. The method according to claim 1 wherein said active feature selection comprises searching for features using a coarse criterion, thereafter searching for features using a fine criterion.

8. A method for recognizing characteristics and identity of a selected human body part in order to recognize a human, the method comprising:
    capturing, by a computer system, as a dataset an image of at least a portion of the human body having a selected human body part, the human body being shown in a sequence of video frames, the portion of the human body being distinguished thereby from a background;
    identifying, by the computer system, a sub-dataset corresponding to the selected body art from the dataset representing the image by subjecting the dataset to a plurality of features-based rejection tests;
    segmenting, by the computer system, the sub-dataset for the selected body part according to identified sub-dataset segments corresponding to selected identities;
    matching, by the computer system, the sub-dataset segments to said selected identities; and
    reporting, by the computer system, the known identities as an output to an output device;
    wherein said segmenting step includes employing foreground information of a previous image frame for current computation, and updating foreground information in preparation for a subsequent frame in order to promote fast multi-level segmentation; and
    wherein foreground information is updated according to the following functions:

$$\mu_l^F(n) = \frac{1}{W} \sum_k \mu_k^F(n) \exp\left(-\frac{1}{2}[\mu_k^F(n) - \mu_l^F(1)]^T \sum_k^{-1} [\mu_k^F(n) - \mu_l^F(1)]\right)$$

-continued $$\sigma_i^F(n) = \frac{1}{W}\sum_k \sigma_k^F(n)\exp\left(-\frac{1}{2}[\sigma_k^F(n)-\sigma_i^F(1)]\sum_k^{T-1}[\sigma_k^F(n)-\sigma_i^F(1)]\right)$$

With:

$$W = \sum_k \exp\left(-\frac{1}{2}[\sigma_k^F(n)-\sigma_i^F(1)]\sum_k^{T-1}[\sigma_k^F(n)-\sigma_i^F(1)]\right)$$

where W is the normalizing factor, $\mu_i^F(n)$ and $\sigma_i^F(n)$ denote the mean and variance of $i^{th}$ components of the foreground for the frame n.

9. A method for recognizing characteristics and identity of a selected human body part in order to recognize a human, the method comprising:
  capturing, by a computer system, as a dataset an image of at least a portion of the human body having a selected human body part, the human body being shown in a sequence of video frames, the portion of the human body being distinguished thereby from a background;
  identifying, by the computer system, a sub-dataset corresponding to the selected body part from the dataset representing the image by subjecting the dataset to a plurality of features-based rejection tests;
  segmenting, by the computer system, the sub-dataset for the selected body part according to identified sub-dataset segments corresponding to selected identities;
  matching, by the computer system, the sub-dataset segments to said selected identities; and
  reporting, by the computer system, the known identities as an output to an output device;
  wherein said segmentation step includes automatically generating trimaps using energy minimization.

10. A system for recognizing humans through recognition of characteristics and identity of a selected human body part in order to recognize a human, the system comprising:
  code in form of tangible nontransitory computer readable media for capturing as a dataset an image of at least a portion of the human body having a selected human body part, the human body being shown in a sequence of video frames, the portion of the human body being distinguished thereby from a background;
  code in form of tangible nontransitory computer readable media for identifying a sub-dataset corresponding to the selected body part from the dataset representing the image by subjecting the dataset to at plurality of features-based rejection tests;
  code in form of tangible nontransitory computer readable media for segmenting the sub-dataset for the selected body part according to identified sub-dataset segments corresponding to selected identities;
  code in form of tangible nontransitory computer readable media for matching the sub-dataset segments to said selected identities; and
  code in form of tangible nontransitory computer readable media for reporting the known identities as an output to an output device;
  wherein the selected body part is the human face and the features based rejection test employs a region variance feature set as a first classifier, the feature set being formulated from integral images used for lighting correction during input scanning and including code in form of tangible nontransitory computer readable media for constructing, as a second classifier, a feature set of differences between only low-low non-normalized Haar transform coefficients.

11. The system according to claim 10 including code in form of tangible nontransitory computer readable media for feature set classifying comprising:
  code in form of tangible nontransitory computer readable media for performing an active boosting procedure on each two-block feature;
  code in form of tangible nontransitory computer readable media for recording a classification error for each boosting procedure;
  code in form of tangible nontransitory computer readable media selecting the two-block feature with lowest error; by
    sorting the two-block features according to errors in order; and
    selecting a plurality of top two-block features;
  code in form of tangible nontransitory computer readable media for composing four-block features from the top two-block features; thereafter
  code in form of tangible nontransitory computer readable media for performing the boosting procedure on each of the four-block features;
  code in form of tangible nontransitory computer readable media for recording classification error for the boosting procedure;
  code in form of tangible nontransitory computer readable media for comparing the classification errors of the four-block features with the classification errors of the top two-block feature; and
  code in form of tangible nontransitory computer readable media for selecting that feature with the lowest overall error.

12. A system for recognizing humans through recognition of characteristics and identity of a selected human body part in order to recognize a human, the system comprising:
  code in form of tangible nontransitory computer readable media for capturing as a dataset an image of at least a portion of the human body having a selected human body part, the human body being shown in a sequence of video frames, the portion of the human body being distinguished thereby from a background;
  code in form of tangible nontransitory computer readable media for identifying a sub-dataset corresponding to the selected body part from the dataset representing the image by subjecting the dataset to at plurality of features-based rejection tests;
  code in form of tangible nontransitory computer readable media for segmenting the sub-dataset for the selected body part according to identified sub-dataset segments corresponding to selected identities;
  code in form of tangible nontransitory computer readable media for matching the sub-dataset segments to said selected identities; and
  code in form of tangible nontransitory computer readable media for reporting the known identities as an output to an output device;
  wherein said segmenting code includes code for employing foreground information of a previous image frame for current computation, and updating foreground information in preparation for a subsequent frame in order to promote fast multi-level segmentation and wherein said foreground information is updated according to the following functions:

$$\mu_i^F(n) = \frac{1}{W} \sum_k \mu_k^F(n) \exp\left(-\frac{1}{2}[\mu_k^F(n) - \mu_i^F(1)]^T \sum_k^{-1} [\mu_k^F(n) - \mu_i^F(1)]\right)$$

$$\sigma_i^F(n) = \frac{1}{W} \sum_k \sigma_k^F(n) \exp\left(-\frac{1}{2}[\sigma_k^F(n) - \sigma_i^F(1)]^T \sum_k^{-1} [\sigma_k^F(n) - \sigma_i^F(1)]\right)$$

With:

$$W = \sum_k \exp\left(-\frac{1}{2}[\sigma_k^F(n) - \sigma_i^F(1)]^T \sum_k^{-1} [\sigma_k^F(n) - \sigma_i^F(1)]\right)$$

where W is the normalizing factor, $\mu_i^F(n)$ and $\sigma_i^F(n)$ denote the mean and variance of $i^{th}$ components of the foreground for the frame n.

13. A system for recognizing humans through recognition of characteristics and identity of a selected human body part in order to recognize a human, the system comprising:

code in form of tangible nontransitory computer readable media for capturing as a dataset an image of at least a portion of the human body having a selected human body part, the human body being shown in a sequence of video frames, the portion of the human body being distinguished thereby from a background;

code in form of tangible nontransitory computer readable media for identifying a sub-dataset corresponding to the selected body part from the dataset representing the image by subjecting the dataset to at plurality of features-based rejection tests;

code in form of tangible nontransitory computer readable media for segmenting the sub-dataset for the selected body part according to identified sub-dataset segments corresponding to selected identities;

code in form of tangible nontransitory computer readable media for matching the sub-dataset segments to said selected identities; and code in form of tangible nontransitory computer readable media for reporting the known identities as an output to an output device;

wherein said segmentation code includes code in form of tangible nontransitory computer readable media for automatically generating trimaps using energy minimization.

* * * * *